United States Patent [19]
Amico et al.

[11] Patent Number: 5,475,200
[45] Date of Patent: Dec. 12, 1995

[54] FIELD REPLACEABLE THERMISTOR WEAR TAPE

[75] Inventors: Mark S. Amico, Rochester; Wayne D. Drinkwater, Fairport; Marilee K. Whitt, Rochester, all of N.Y.

[73] Assignee: Xerox Corporation, Stamford, Conn.

[21] Appl. No.: 295,568

[22] Filed: Aug. 25, 1994

[51] Int. Cl.⁶ .......................... G03G 15/20; G01K 13/08
[52] U.S. Cl. .......................... 219/471; 219/216; 374/153
[58] Field of Search .................... 219/216, 388, 219/469, 470, 471; 374/153, 158, 209

[56] References Cited

U.S. PATENT DOCUMENTS

| | | | |
|---|---|---|---|
| 3,202,818 | 8/1965 | Thomiszer | 219/216 |
| 3,914,862 | 10/1975 | McBride, Jr. et al. | 29/612 |
| 4,086,650 | 4/1978 | Davis et al. | 361/229 |
| 4,419,023 | 12/1983 | Hager, Jr. | 374/153 |
| 4,441,827 | 4/1984 | Coderre | 374/153 |
| 4,588,667 | 5/1986 | Jones et al. | 430/73 |
| 4,654,284 | 3/1987 | Yu et al. | 430/59 |
| 4,780,385 | 10/1988 | Wieloch et al. | 430/58 |
| 4,821,062 | 4/1989 | Katoh et al. | 355/3 FU |
| 4,877,331 | 10/1989 | Schrors et al. | 374/153 |
| 5,194,890 | 3/1993 | Haruna et al. | 355/77 |
| 5,281,793 | 1/1994 | Gavin et al. | 219/216 |

FOREIGN PATENT DOCUMENTS 59-44633  3/1984  Japan.

*Primary Examiner*—Geoffrey S. Evans
*Assistant Examiner*—Gregory L. Mills

[57] ABSTRACT

A wear resistant member is loosely disposed about a thermistor in contact with a thermistor bead such that it is between the bead and a heated fuser member and completely surrounds the components of the thermistor. The wear resistant member is in the form of a strap or tape having an opening adjacent one end through the opposite end is insertable. The inserted end is configured such that once it is inserted it can't be withdrawn through the opening. The strap is loosely supported in its operative position and can be easily removed, for example, by cutting through the strap and then withdrawing the strap from around the thermistor. Thus, a worn strap can be removed and a new one installed without discarding the thermistor and more importantly discarding the thermistor assembly.

8 Claims, 5 Drawing Sheets

FIELD REPLACEABLE THERMISTOR WEAR TAPE

BACKGROUND OF THE INVENTION

This invention relates generally to a heat and pressure fuser for an electrophotographic printing machine, and more particularly the invention is directed to a thermistor for measuring the surface temperature of a heated fuser member.

In a typical electrophotographic printing process, a photoconductive member is charged to a substantially uniform potential so as to sensitize the surface thereof. The charged portion of the photoconductive member is exposed to selectively dissipate the charges thereon in the irradiated areas. This records an electrostatic latent image on the photoconductive member. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

In order to fix or fuse the toner material onto a support member permanently by heat, it is necessary to elevate the temperature of the toner material to a point at which constituents of the toner material coalesce and become tacky. This action causes the toner to flow to some extent onto the fibers or pores of the support members or otherwise upon the surfaces thereof. Thereafter, as the toner material cools, solidification of the toner material occurs causing the toner material to be bonded firmly to the support member.

One approach to thermal fusing of toner material images onto the supporting substrate has been to pass the substrate with the unfused toner images thereon between a pair of opposed roller members at least one of which is internally heated. During operation of a fusing system of this type, the support member to which the toner images are electrostatically adhered is moved through the nip formed between the rolls with the toner image contacting the heated fuser roll to thereby effect heating of the toner images within the nip.

Thermistors are typically used to sense the temperature of a fuser roll in xerographic machines. Every fusing surface mounted temperature sensor requires a wear tape. This tape minimizes the the effects of wear on the fuser roll due to the intimate contact of the temperature sensor. The tape however does eventually wear. If the tape is not replaced prior to the tape completely wearing through, fuser roll damage will occur. Historically the entire thermistor assembly is replaced. This assembly normally consists of a plastic housing, foam, wires, electrical connector, plus the thermistor bead. A typical 1090 style temperature assembly cost $6.11 (1994 dollars). For 1090 family, 4850, & 4890 machines the replacement rate for these assemblies is one or two for every 1.2–1.5 per million prints. The 4890 machine incorporates two sensors in its design, thus doubling the cost of discarding the thermistor assembly once the tape has worn.

Following is a discussion of prior art, incorporated herein by reference, which may bear on the patentability of the present invention. In addition to possibly having some relevance to the question of patentability, these references, together with the detailed description to follow, may provide a better understanding and appreciation of the present invention.

U.S. Pat. No. 5,281,793 granted to Gavin et on Jan. 25, 1994 discloses an apparatus for positioning a temperature sensing element in temperature sensing relationship with a moving object. The apparatus includes a base and also a resilient member, attached to the base, for supporting the sensing element. The apparatus further includes a mechanism for urging the sensing element toward the moving object. Moreover, the apparatus includes a mechanism, interposed between the resilient member and the moving object, for reducing frictional resistance between the apparatus and the moving object. The apparatus additionally includes a mechanism, removably attachable to the base, for securing the resistance reducing mechanism at a position interposed between the resilient member and the moving object. In this patent, a portion of a tape is interposed between a resilient member and a fuser roll for minimizing friction therebetween. The tape is fabricated from a polyimide film. By way of example, tape can be made from KAPTON, a trademark of E. I. duPont de Nemours & Co., Inc. of Wilmington, Del.

U.S. Pat. No. 5,194,890 granted to Haruna et al on Mar. 16, 1993 discloses a temperature sensor is fixed on the copying apparatus so that it makes contact with the surface of the heating roller which is coated with teflon (tetrafluoroethylene). The temperature sensor is covered with kapton resin to improve the wear-resistance.

U.S. Pat. No. 3,914,862 granted to McBride et al discloses a method of making a sensor wherein a cylindrical Kapton sleeve used for insulating the side walls of a can.

Japanese publication 59-44633 dated Mar. 13, 1984 discloses a temperature detector for a fixing roll wherein a polyimide sheet is made to adhere as one body to a plastic substrate.

U.S. Pat. No. 4,821,062 granted to Katoh et al on Apr. 11, 1989 discloses a thermistor employing a tape of heat resistive material such as Teflon of polyimide resin. The tape is adhered to the thermistor assembly at a position between a heat roller and the thermistor to prevent the roller from being damaged.

As will be appreciated, it would be highly desirable to be able to easily replace a worn strap or tape that costs 37 cents rather than an entire thermistor assembly.

BRIEF SUMMARY OF THE INVENTION

According to the present invention, a thermistor assembly is provided which allows for easy replacement of a wear resistant strap forming a part thereof. The assembly comprises a very thin Kapton tape disposed between a thermistor bead and a heated fuser roll surface. The purpose of the relatively thin tape is reduce the friction between the thermistor and the rotating fuser roll. Unlike prior art tapes the thermistor is fabricated such that when the tape has worn the entire thermistor does not have to be discarded. To this end the Kapton tape is constructed such that it does not form an attached or permanent part of the thermistor. Rather, the tape is constructed such that it can easily inserted between the thermistor structure and the rotating surface which it contacts. Moreover, the tape can easily be removed without dismantling the thermistor. For example, the tape which forms a continuous loop about the thermistor bead and other parts of the thermistor may be cut such that it can be easily removed from between the thermistor bead and the fuser roll surface.

Other features of the present invention will become apparent as the following description proceeds and upon reference to the drawings, in which:

While the present invention will be described in connection with a tri-level printing, it will be understood that it is not intended to limit the invention to that type of printing. On the contrary, it is intended to cover all alternatives, modifications, and equivalents as may be included within the spirit and scope of the invention as defined by the appended claims.

DETAILED DESCRIPTION OF THE PREFERRED EMBODIMENT OF THE INVENTION

Figure 4:
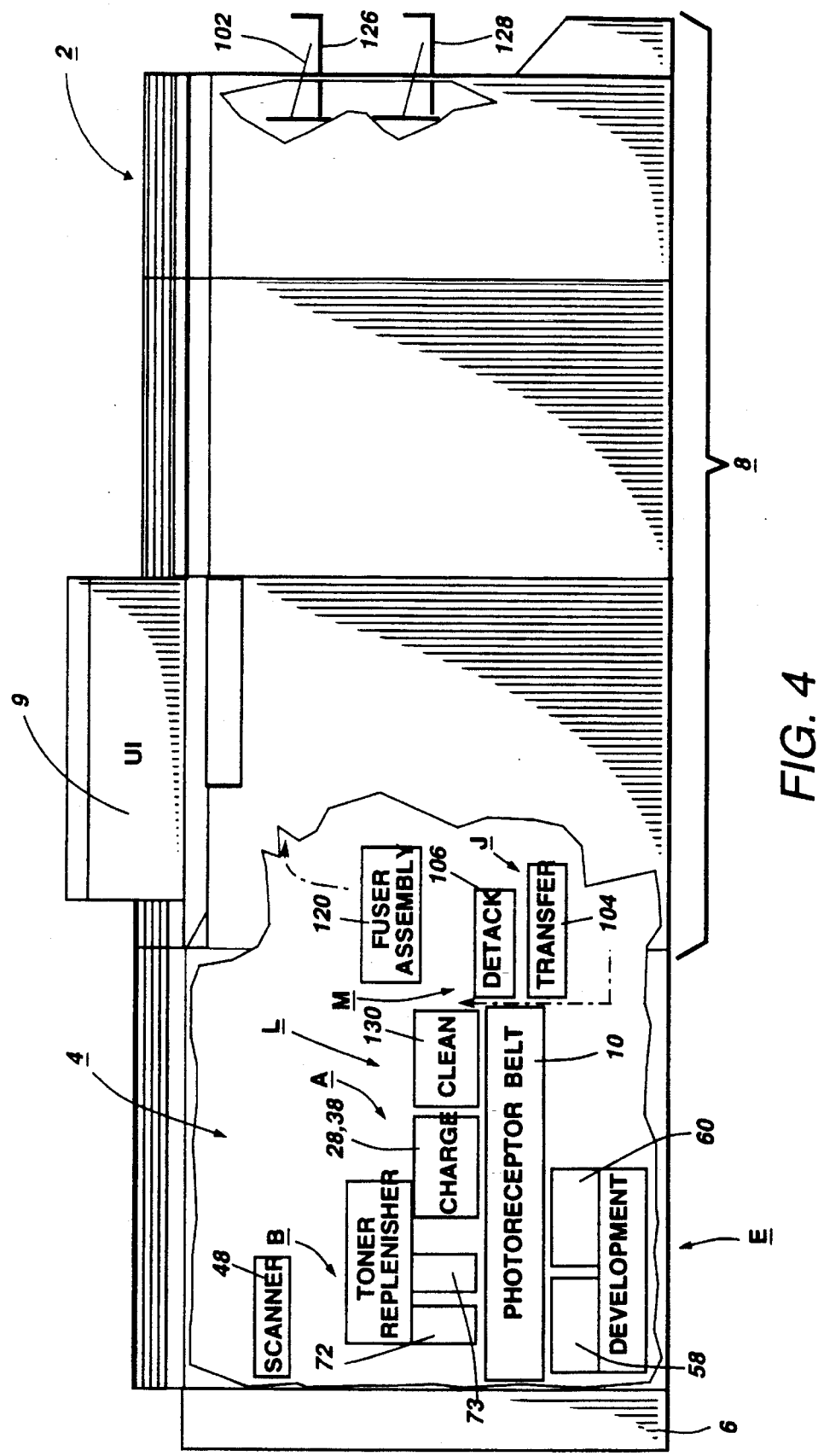
FIG. 4 is schematic illustration of a printing apparatus in which the inventive features of the invention may be utilized.
Figure 5:
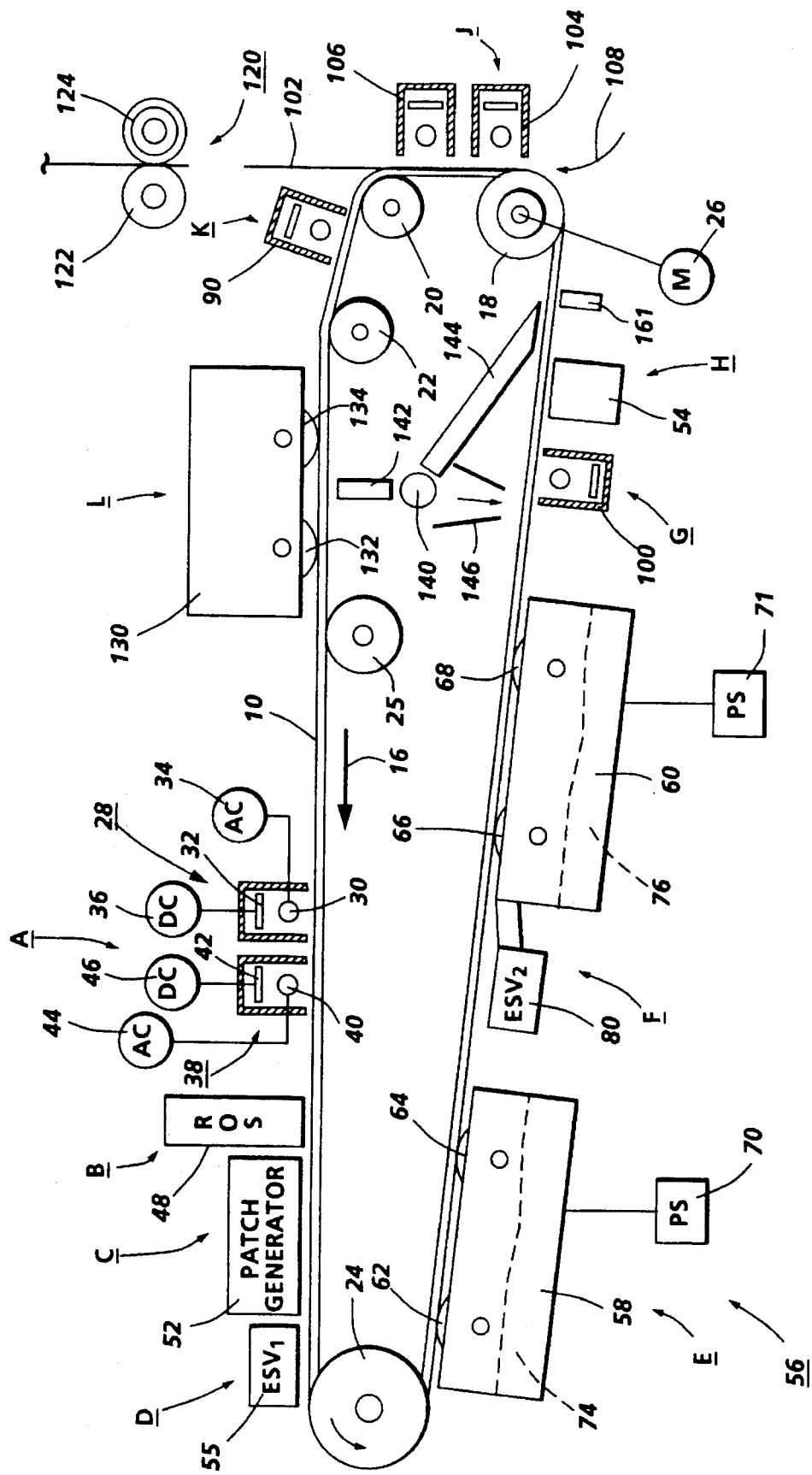
FIG. 5 a schematic of the xerographic process stations including the active members for image formation as well as the control members operatively associated therewith of the printing apparatus illustrated in FIG. 4.

As shown in FIGS. 4 and 5, a highlight color printing apparatus 2 in which the invention may be utilized comprises a xerographic processor module 4, an electronics module or microprocessor 6, a paper handling module 8 and a user interface (UI) 9. A charge retentive member in the form of an Active Matrix (AMAT) photoreceptor belt 10 is mounted for movement in an endless path past a charging station A, an exposure station B, a test patch generator station C, a first Electrostatic Voltmeter (ESV) station D, a developer station E, a second ESV station F within the developer station E, a pretransfer station G, a toner patch reading station H where developed toner patches are sensed, a transfer station J, a preclean station K, cleaning station L and a fusing station M. Belt 10 moves in the direction of arrow 16 to advance successive portions thereof sequentially through the various processing stations disposed about the path of movement thereof. Belt 10 is entrained about a plurality of rollers 18, 20, 22, 24 and 25, the former of which can be used as a drive roller and the latter of which can be used to provide suitable tensioning of the photoreceptor belt 10. Motor 26 rotates roller 18 to advance belt 10 in the direction of arrow 16. Roller 18 is coupled to motor 26 by suitable means such as a belt drive, not shown. The photoreceptor belt may comprise a flexible belt photoreceptor. Typical belt photoreceptors are disclosed in U.S. Pat. Nos. 4,588,667, 4,654,284 and 4,780,385.

As can be seen by further reference to FIGS. 4 and 5, initially successive portions of belt 10 pass through charging station A. At charging station A, a primary corona discharge device in the form of dicorotron indicated generally by the reference numeral 28, charges the belt 10 to a selectively high uniform negative potential, $V_0$. As noted above, the initial charge decays to a dark decay discharge voltage, $V_{ddp}$, ($V_{CAD}$). The dicorotron is a corona discharge device including a corona discharge electrode 30 and a conductive shield 32 located adjacent the electrode. The electrode is coated with relatively thick dielectric material. An AC voltage is applied to the dielectrically coated electrode via power source 34 and a DC voltage is applied to the shield 32 via a DC power supply 36. The delivery of charge to the photoconductive surface is accomplished by means of a displacement current or capacitative coupling through the dielectric material. The flow of charge to the P/R 10 is regulated by means of the DC bias applied to the dicorotron shield. In other words, the P/R will be charged to the voltage applied to the shield 32. For further details of the dicorotron construction and operation, reference may be had to U.S. Pat. No. 4,086,650 granted to Davis et al on Apr. 25, 1978.

A feedback dicorotron 38 comprising a dielectrically coated electrode 40 and a conductive shield 42 operatively interacts with the dicorotron 28 to form an integrated charging device (ICD). An AC power supply 44 is operatively connected to the electrode 40 and a DC power supply 46 is operatively connected to the conductive shield 42.

Next, the charged portions of the photoreceptor surface are advanced through exposure station B. At exposure station B, the uniformly charged photoreceptor or charge retentive surface 10 is exposed to a laser based input and/or output scanning device 48 which causes the charge retentive surface to be discharged in accordance with the output from the scanning device. Preferably the scanning device is a three level laser Raster Output Scanner (ROS). Alternatively, the ROS could be replaced by a conventional xerographic exposure device. The ROS comprises optics, sensors, laser tube and resident control or pixel board.

The photoreceptor, which is initially charged to a voltage $V_0$, undergoes dark decay to a level $V_{ddp}$ or $V_{CAD}$ equal to about −900 volts to form CAD images. When exposed at the exposure station B it is discharged to $V_c$ or $V_{DAD}$ equal to about −100 volts to form a DAD image which is near zero or ground potential in the highlight color (i.e. color other than black) parts of the image. The photoreceptor is also discharged to $V_w$ or $V_{mod}$ equal to approximately minus 500 volts in the background (white) areas.

A patch generator 52 (FIGS. 5 and 6) in the form of a conventional exposure device utilized for such purpose is positioned at the patch generation station C. It serves to create toner test patches in the interdocument zone which are used both in a developed and undeveloped condition for controlling various process functions. An Infrared densitometer (IRD) 54 is utilized to sense or measure the voltage level of test patches after they have been developed.

After patch generation, the P/R is moved through a first ESV station D where an ESV (ESV$_1$) 55 is positioned for sensing or reading certain electrostatic charge levels (i.e. $V_{DAD}$, $V_{CAD}$, $V_{Mod}$, and $V_{tc}$) on the P/R prior to movement of these areas of the P/R moving through the development station E.

At development station E, a magnetic brush development system, indicated generally by the reference numeral 56 advances developer materials into contact with the electrostatic latent images on the P/R. The development system 56 comprises first and second developer housing structures 58 and 60. Preferably, each magnetic brush development housing includes a pair of magnetic brush developer rollers. Thus, the housing 58 contains a pair of rollers 62, 64 while the housing 60 contains a pair of magnetic brush rollers 66,

68. Each pair of rollers advances its respective developer material into contact with the latent image. Appropriate developer biasing is accomplished via power supplies 70 and 71 electrically connected to respective developer housings 58 and 60. A pair of toner replenishment devices 72 and 73 (FIG. 4) are provided for replacing the toner as it is depleted from the developer housing structures 58 and 60.

Color discrimination in the development of the electrostatic latent image is achieved by passing the photoreceptor past the two developer housings 58 and 60 in a single pass with the magnetic brush rolls 62, 64, 66 and 68 electrically biased to voltages which are offset from the background voltage $V_{Mod}$, the direction of offset depending on the polarity of toner in the housing. One housing e.g. 58 (for the sake of illustration, the first) contains red conductive magnetic brush (CMB) developer 74 having triboelectric properties (i.e. negative charge) such that it is driven to the least highly charged areas at the potential $V_{DAD}$ of the latent images by the electrostatic development field ($V_{DAD}-V_{color\ bias}$) between the photoreceptor and the development rolls 62, 64. These rolls are biased using a chopped DC bias via power supply 70.

The triboelectric charge on conductive black magnetic brush developer 76 in the second housing is chosen so that the black toner is urged towards the parts of the latent images at the most highly charged potential $V_{CAD}$ by the electrostatic development field ($V_{CAD-Vblack\ bias}$) existing between the photoreceptor and the development rolls 66, 68. These rolls, like the rolls 62, 64, are also biased using a chopped DC bias via power supply 71. By chopped DC (CDC) bias is meant that the housing bias applied to the developer housing is alternated between two potentials, one that represents roughly the normal bias for the DAD developer, and the other that represents a bias that is considerably more negative than the normal bias, the former being identified as $V_{Bias\ Low}$ and the latter as $V_{Bias\ High}$. This alternation of the bias takes place in a periodic fashion at a given frequency, with the period of each cycle divided up between the two bias levels at a duty cycle of from 5–10% (Percent of cycle at $V_{Bias\ High}$) and 90–95% at $V_{Bias\ Low}$. In the case of the CAD image, the amplitude of both $V_{Bias\ Low}$ and $V_{Bias\ High}$ are about the same as for the DAD housing case, but the waveform is inverted in the sense that the the bias on the CAD housing is at $V_{Bias\ High}$ for a duty cycle of 90–95%. Developer bias switching between $V_{Bias\ High}$ and $V_{Bias\ Low}$ is effected automatically via the power supplies 70 and 71. For further details regarding CDC biasing, reference may be had to U.S. Pat. No. 5,080,988 granted to Germain et al on Jan. 14, 1992 and assigned to same assignee as the instant application.

In contrast, in conventional tri-level imaging as noted above, the CAD and DAD developer housing biases are set at a single value which is offset from the background voltage by approximately−100 volts. During image development, a single developer bias voltage is continuously applied to each of the developer structures. Expressed differently, the bias for each developer structure has a duty cycle of 100%.

Because the composite image developed on the photoreceptor consists of both positive and negative toner, a negative pretransfer dicorotron member 100 at the pretransfer station G is provided to condition the toner for effective transfer to a substrate using positive corona discharge.

Subsequent to image development a sheet of support material 102 (FIG. 5) is moved into contact with the toner image at transfer station J. The sheet of support material is advanced to transfer station J by conventional sheet feeding apparatus comprising a part of the paper handling module 8. Preferably, the sheet feeding apparatus includes a feed roll contacting the uppermost sheet of a stack copy sheets. The feed rolls rotate so as to advance the uppermost sheet from stack into a chute which directs the advancing sheet of support material into contact with photoconductive surface of belt 10 in a timed sequence so that the toner powder image developed thereon contacts the advancing sheet of support material at transfer station J.

Transfer station J includes a transfer dicorotron 104 which sprays positive ions onto the backside of sheet 102. This attracts the negatively charged toner powder images from the belt 10 to sheet 102. A detack dicorotron 106 is also provided for facilitating stripping of the sheets from the belt 10.

After transfer, the sheet continues to move, in the direction of arrow 108, onto a conveyor (not shown) which advances the sheet to fusing station M. Fusing station M includes a fuser assembly, indicated generally by the reference numeral 120, which permanently affixes the transferred powder image to sheet 102. Preferably, fuser assembly 120 comprises a heated fuser roller 122 having an outer coating or layer of silicone rubber and a deformable backup roller 124 comprising an outer layer comprising a copolymer perfluoroalkyl perfluorovinyl ether with tetrafluroethylene (PFA). Sheet 102 passes between fuser roller 122 and backup roller 124 with the toner powder image contacting fuser roller 122. In this manner, the toner powder image is permanently affixed to sheet 102 after it is allowed to cool. After fusing, a chute, not shown, guides the advancing sheets 102 to a catch trays 126 and 128 (FIG. 4) for subsequent removal from the printing machine by the operator.

The heated fuser roll 122 utilizes two lamps 170 and 172. The lamp 170 provides a uniform output of approximately 125 watts per linear inch at 200 volts over its 14 inch length. The lamp 172 provides approximately 125 watts over the outboard 11 inches and only 0 watts over the inboard three inches.

Figure 1:
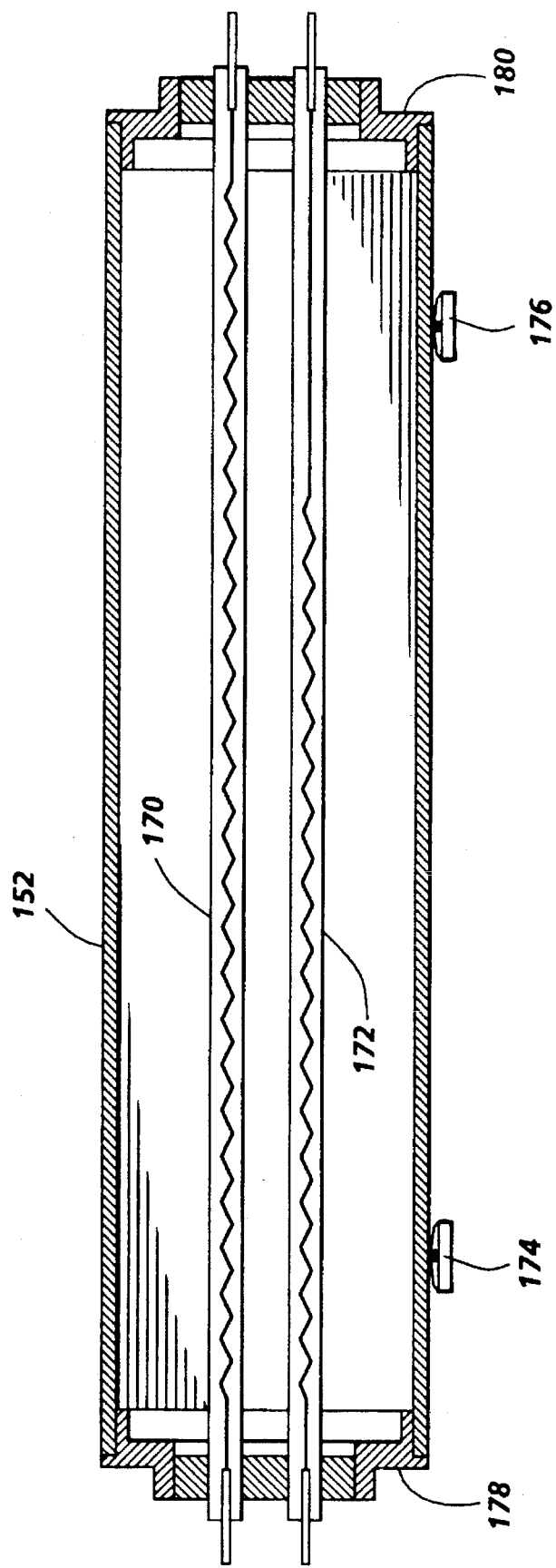
FIG. 1 is schematic view of a fuser roll and a pair of thermistors used for controlling the surface temperature of the fuser roll.
Figure 2:
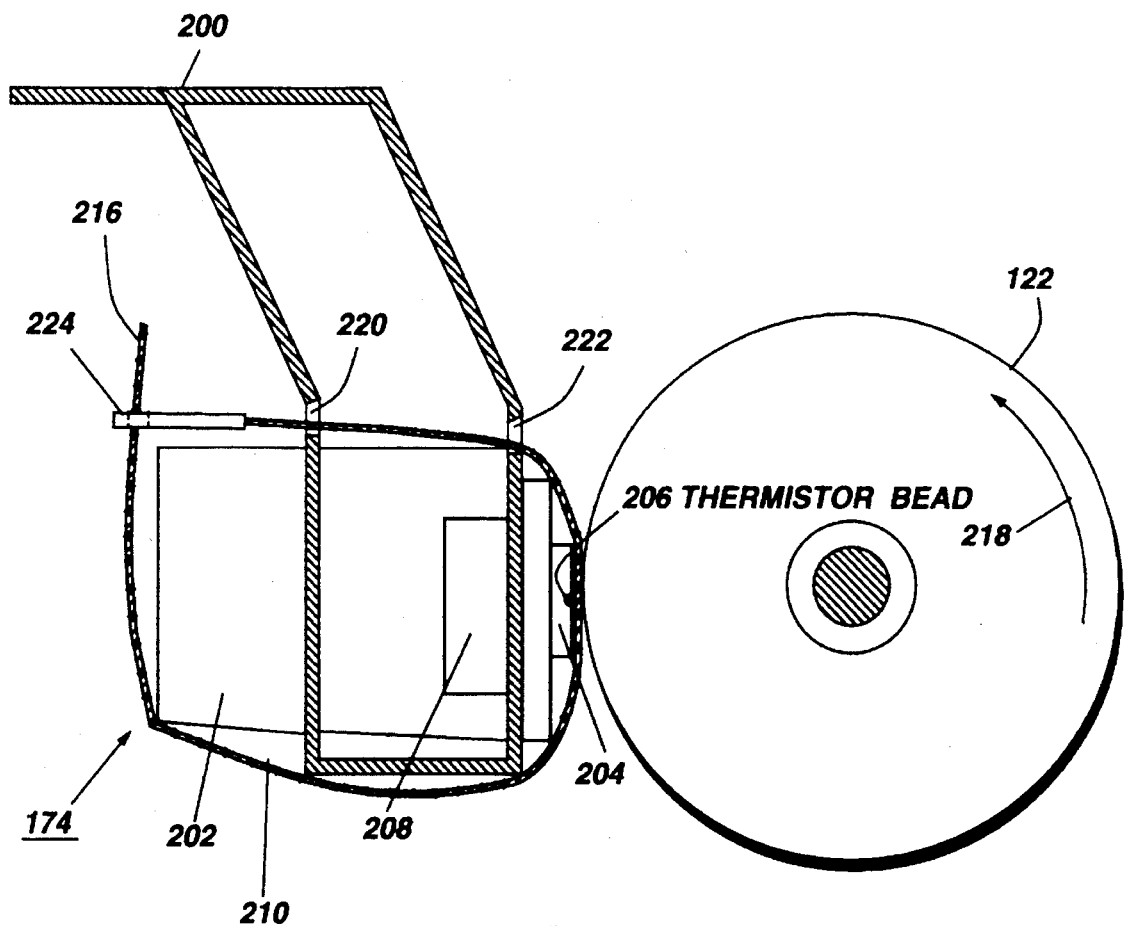
FIG. 2 is a schematic view of a fuser roll and thermistor structure for monitoring the temperature of the roll.
Figure 3:
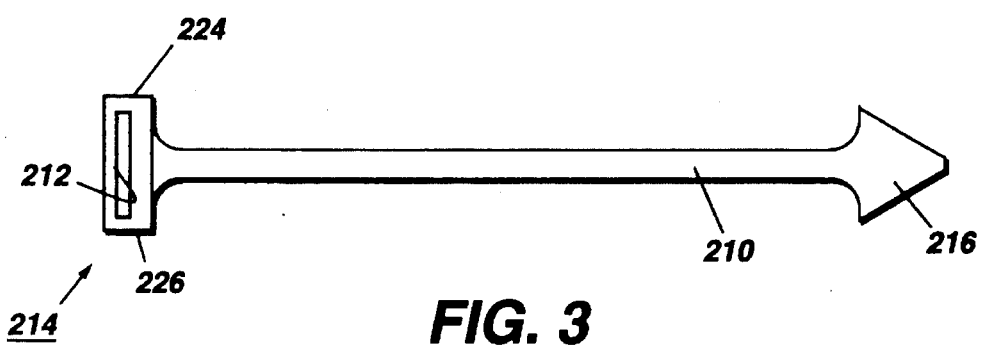
FIG. 3 is a plan view of a wear resistant strap or tape for use with the thermistor structure illustrated in FIG. 2.

The surface temperature is monitored using two thermistors 174 and 176 mounted approximately 195 angular degrees, counterclockwise from the fusing nip as viewed in FIG. 2. In an arrangement where the fuser roll and pressure roll are positioned in a side by side orientation, the fuser nip is at approximately the three o'clock position and the thermistors are located at approximately the eight o'clock.

The thermistor 174 is positioned adjacent the inboard end 178 of the fuser roll while the thermistor 176 is positioned adjacent the outboard end 180 thereof. The outboard thermistor is utilized for controlling the surface temperature of the heated fuser roll while the inboard thermistor is used for determining which lamp is activated.

When running 14 inch prints a temperature imbalance is not expected across the roll and either thermistor can be used to control the on-time of the 14 inch lamp. When running 11 inch prints, however, it is expected that the last three inches on the inboard end will be colder (higher loss to the pressure roll) and the outboard thermistor must be used to maintain the fuser temperature over the outboard 11 inches (print area). Therefore, the outboard thermistor is used to determine the desired on-time of the fuser lamp and the inboard thermistor is used to determine which lamp is on. If the inboard temperature is below target the 14 inch lamp is turned on. If the inboard temperature is at or above target the 11 inch lamp is turned on.

The voltages from the thermistors are converted to a

0–255 bit scale in machine firmware where a thermistor reading of 0 bits corresponds to 450°±15° F. and a thermistor reading of 255 bits corresponds to 250°±15° F.

Proper control consists of maintaining the fuser at one of three separate temperatures depending on the state of the machine. During runtime, when the fuser roll, pressure roll, and wick are engaged and paper is being fed, the roll temperature is maintained at a runtime target of approximately 183 bits (335° F.). When the machine is in standby the fuser roll, pressure roll, and oil wick are disengaged and the fuser roll temperature is maintained at a target of approximately 220 bits (370° F.). A third state, known as ready, is declared as the fuser temperature approaches standby (i.e., in an initial power up), indicating that the fuser temperature is sufficiently high to allow the printer to commit to a job. Ready is typically about 10 bits below standby. The algorithm used by the microprocessor inverts or flips the bit values resulting in the higher bit value 200 corresponding to a higher temperature than the lower bit value 183.

The thermistor output relating bits to temperature in °F. is highly nonlinear but over the range of targets listed above corresponds to 1 bit ≈1° F.

Machine data shows that when the fuser lamp is unplugged and the fuser is operating near 335° F., the temperature drop measured by a non-contact infrared detector when running 14 inch paper is approximately 0.3° F. per print. The Andromeda printer generates 92 prints per minute so the steady state thermal loss to paper is approximately 0.5° F. per second.

With the 125 watt lamp, machine data indicated that the long term 14 inch lamp duty cycle with 14 inch paper and a 0.090 inch silicone coating roll was 65%. Model calculations reported herein are, therefore, based on a 0.5° F. loss per second to paper and a 0.5/0.65=0.77° F. gain per second from the lamp.

In the initial transition from standby to runtime after the pressure roll and oil wick are engaged but prior to paper entering the fusing nip the fuser roll temperature drops about 3.3 bits per second. In the initial transition from runtime to standby after the pressure roll and oil wick are disengaged the fuser roll temperature increases about 3.0 bits for each second of lamp on time.

After the sheet of support material is separated from photoconductive surface of belt 10, the residual toner particles carried by the non-image areas on the photoconductive surface are removed therefrom. These particles are removed at cleaning station L. A cleaning housing 130 supports there within two cleaning brushes 132, 134 supported for counter-rotation with respect to the other and each supported in cleaning relationship with photoreceptor belt 10. Each brush 132, 134 is generally cylindrical in shape, with a long axis arranged generally parallel to photoreceptor belt 10, and transverse to photoreceptor movement direction 16. Brushes 132, 134 each have a large number of insulative fibers mounted on base, each base respectively journaled for rotation (driving elements not shown). The brushes are typically detoned using a flicker bar and the toner so removed is transported with air moved by a vacuum source (not shown) through the gap between the housing and photoreceptor belt 10, through the insulative fibers and exhausted through a channel, not shown. A typical brush rotation speed is 1300 rpm, and the brush/photoreceptor interference is usually about 2 mm. Brushes 132, 134 beat against flicker bars (not shown) for the release of toner carried by the brushes and for effecting suitable tribo charging of the brush fibers.

Subsequent to cleaning, a discharge lamp 140 floods the photoconductive surface 10 with light to dissipate any residual negative electrostatic charges remaining prior to the charging thereof for the successive imaging cycles. To this end, a light pipe 142 is provided. Another light pipe 144 serves to illuminate the backside of the P/R downstream of the pretransfer dicorotron 100. The P/R is also subjected to flood illumination from the lamp 140 via a light channel 146.

Figure 6:
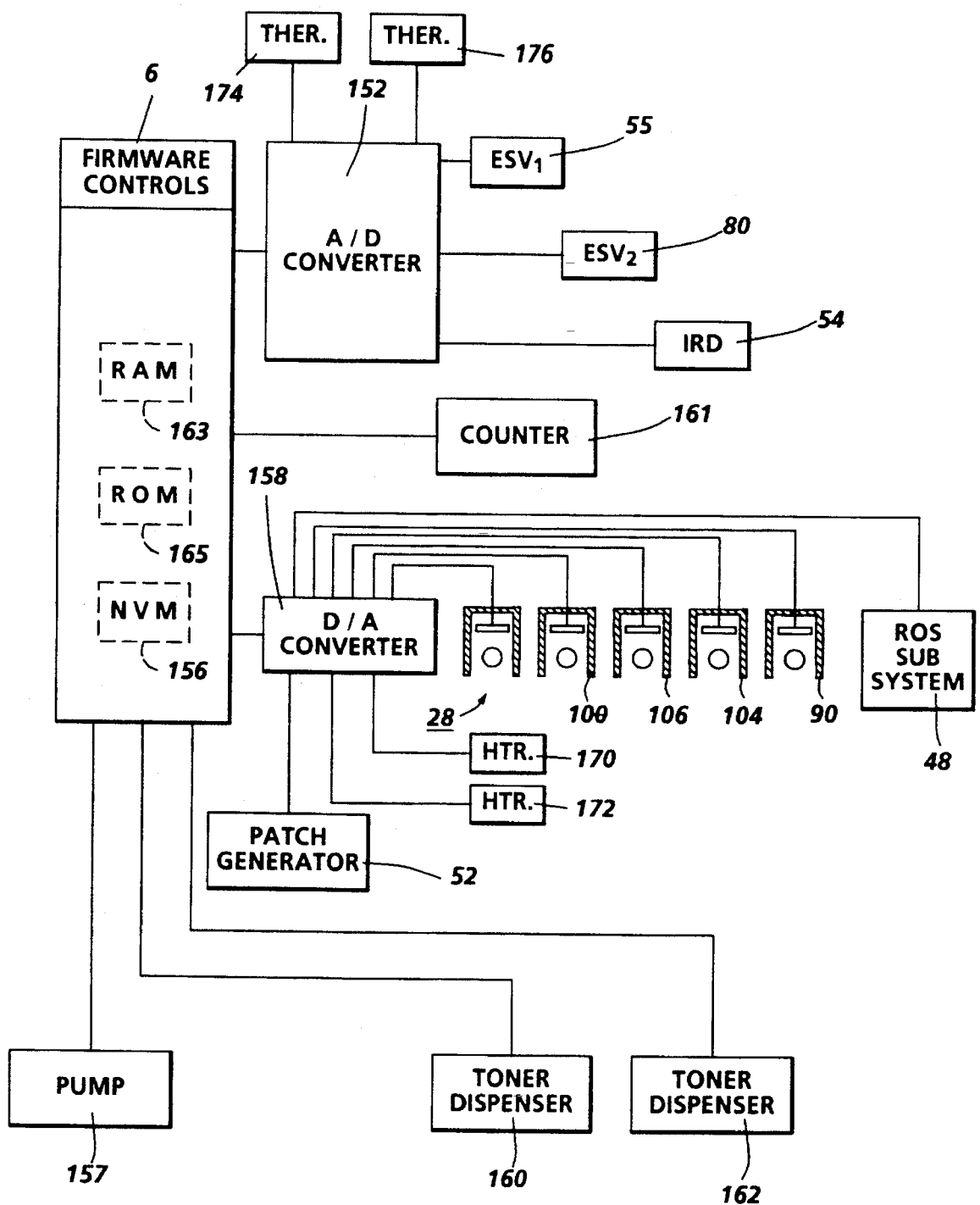
FIG. 6 is a block diagram illustrating the interconnection among active components of the xerographic process module and the control devices utilized to control them.

FIG. 6 depicts the the interconnection among active components of the xerographic process module 4 and the sensing or measuring devices utilized to control them. As illustrated therein, $ESV_1$, $ESV_2$ and IRD 54 are operatively connected to a control board 150 through an analog to digital (A/D) converter 152. $ESV_1$ and $ESV_2$ produce analog readings in the range of 0 to 10 volts which are converted by Analog to Digital (A/D) converter 152 to digital values in the range 0–255. Each bit corresponds to 0.040 volts (10/255) which is equivalent to photoreceptor voltages in the range 0–1500 where one bit equals 5.88 volts (1500/255).

The digital value corresponding to the analog measurements are processed in conjunction with a Non-Volatile Memory (NVM) 156 by firmware forming a part of the microprocessor 6. The digital values arrived at are converted by a digital to analog (D/A) converter 158 for use in controlling the ROS 48, dicorotrons 28, 90, 100, 104 and 106. Toner dispensers 160 and 162 are controlled by the digital values. Target values for use in setting and adjusting the operation of the active machine components are stored in NVM.

IRD 54 is used to monitor the toner control patches written in interdocument zones and developed by the developer structures 58 and 60. For low developed mass, reflection IRDs are quite sensitive to the amount of toner present but the amount of developed toner is very sensitive to small changes in patch development field. As the patch developed mass is increased, the sensitivity to voltage variations is reduced but the output of the IRD suffers from a reduced signal-to-noise ratio. The toner patch voltage can vary for many reasons including dirt (i.e. toner) buildup on the patch generator lens, variations in the patch generator exposure LEDs, changes (fatigue, dark decay, etc) in the P/R Photo-Induced Discharge Curve (PIDC). In a tri-level xerographic system the black toner patch voltage is also affected by wrong-sign color background development and voltage loss via conductivity of the color developer brush.

$ESV_1$ and $ESV_2$ monitor the various control patch voltages to allow for feedback control. While the system is constantly adjusting the patch generator exposure to keep the toner patch voltage at its proper target, small errors in the patch voltage are inevitable. This can result in small changes in the patch development field and associated variations in the developed patch mass. This, in turn, can finally lead to shifts in the developer housing toner concentration.

However, this problem is avoided by using the ESV readings to adjust the IRD readings of each toner patch. For the black toner patch $ESV_2$ readings are used to monitor the patch voltage. If the voltage is above target (high development field) the IRD reading is increased by an amount proportional to the voltage error or voltage difference. Conversely, if $V_{tb}$ is below target, the IRD reading is reduced by such an amount.

For the color toner patch $ESV_1$ readings and the dark decay projection to the color housing are used to make a similar correction to the color toner patch IRD readings (but opposite in sign because, for color, a lower voltage results in a higher development field). To this end both $ESV_1$ and $ESV_2$ are used to measure the charge on the color toner patch and an interpolated value is calculated from these measured values according to the following formula:

$$V_{tc}@Color=V_{tc}@ESV_1-0.465\times(V_{MOD}@ESV_1-V_{Mod}@ESV_2)$$

For a better understanding of the derivation of the foregoing interpolation reference may be had to U.S. Pat. No. 5,157,441 granted to Scheuer et al on Oct. 20, 1992.

The calculated target values are utilized to control operation of heater members 170 and 172. To this end digital bit values corresponding to the target values are made available, using suitable circuitry, to the heater members 170 and 172 via the Digital to Analog converter 158 for controlling the voltages applied to the heater members for run and standby operation.

Each thermistor 174 and 176 comprises a support bracket 200 for supporting the thermistor structure adjacent the fuser roll 122. The thermistor structures 174 and 176 are identical each comprising a plastic housing 202, a resilient backing member 204 and a thermistor bead 206. A pair of locating tabs 208 (only one shown) carried by the housing 202 serve to position the thermistor structure in the support bracket.

A wear resistant member in the form of a strap or tape member 210 has a rectangular slot or opening 212 adjacent and end 214 thereof. Another end 216 of the strap member 210 has the shape of an arrow which allows it to be inserted through the opening in a manner similar to conventional plastic bag ties. Once inserted, the arrow-shaped end of the strap can't be withdrawn through the opening. The strap or tape 210 encircles the housing 202, resilient member 204 and the thermistor bead 206 such that when the thermistor structure is installed in the the strap is interposed between the surface of the fuser roll 122 and the thermistor bead 206. The bracket 200 is fabricated from resilient metal material and serves to mechanically bias the thermistor structure towards the fuser roll for effecting intimate contact between the strap, bead and fuser roll surface.

As noted by the arrow 218, the direction of rotation of the fuser roll is in the counterclockwise direction as indicated in FIG. 2. Initial operation of the fuser causes the strap 210 to move in a clockwise direction thereby causing the end 214 to also move a small distance in that direction through a pair of slots 220 and 222 in the bracket 200. Continued movement of the strap is prevented because the slots are narrower than the strap end 214. Thus, protruding portions 224 and 226 abut or contact the bracket areas delimiting the opening 212.

The strap is preferably fabricated from a polyimide material such as Kapton™ (E. I. Dupont, Inc.). It has a thickness of approximately 0.005 inch and can, therefore, be easily cut for removal thereof. Once cut, the strap is readily removed without having to disturb the rest of the thermistor structure. This is accomplished by pulling on one or the other of the ends thereof after cutting. A new strap can be easily installed once the worn one has been removed. Installation is effected by inserting the end 216 through the slots 220 and 222 and then between the thermistor bead and the fuser roll. Once the foregoing has been accomplished, the end 216 can be inserted through the opening 212.

We claim:

1. Fuser apparatus including a heated fuser roll, said apparatus comprising:

a thermistor structure including a bead member;

a support bracket for operatively supporting said thermistor structure in contact with said fuser roll;

a low friction member having a generally cylindrical shape, said low friction member loosely encircling said thermistor structure including said bead member such that it is disposed intermediate said bead member and said fuser roll such that it is rotated via said fuser roll.

2. Apparatus according to claim 1 wherein said low friction member is fabricated from polyimide.

3. Apparatus according to claim 1 wherein said low friction member is relatively thin thereby facilitating cutting thereof pursuant to its removal.

4. Apparatus according to claim 3 wherein said low friction member comprises an opening in one end thereof, an opposite end of said low friction member being shaped such as to allow insertion thereof through said opening and preventing withdrawal from said opening once inserted.

5. Apparatus according to claim 4 wherein said support bracket is provided with a pair of slots through which said wear resistant member is inserted.

6. Apparatus according to claim 5 wherein said one end has an area which is larger than said slots thereby limiting rotation of said wear resistant member.

7. Apparatus according to claim 6 wherein said low friction member is fabricated from polyimide.

8. Apparatus according to claim 7 wherein said opposite end has the shape of an arrow.

\* \* \* \* \*